United States Patent
Tanaka et al.

(10) Patent No.: US 9,834,678 B2
(45) Date of Patent: Dec. 5, 2017

(54) RADIATION-CURABLE SILICONE COMPOSITION

(71) Applicant: SHIN-ETSU CHEMICAL CO., LTD., Tokyo (JP)

(72) Inventors: Kenji Tanaka, Annaka (JP); Shinji Irifune, Annaka (JP); Shunji Aoki, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 125 days.

(21) Appl. No.: 14/635,721

(22) Filed: Mar. 2, 2015

(65) Prior Publication Data

US 2015/0252193 A1   Sep. 10, 2015

(30) Foreign Application Priority Data

Mar. 5, 2014 (JP) .................. 2014-042886

(51) Int. Cl.
| | |
|---|---|
| C08L 83/06 | (2006.01) |
| C08K 5/00 | (2006.01) |
| D21H 25/06 | (2006.01) |
| D21H 19/32 | (2006.01) |
| C09J 7/02 | (2006.01) |
| D21H 19/24 | (2006.01) |
| C08G 77/14 | (2006.01) |

(52) U.S. Cl.
CPC ............ C08L 83/06 (2013.01); C08K 5/0025 (2013.01); C09J 7/0228 (2013.01); D21H 19/24 (2013.01); D21H 19/32 (2013.01); D21H 25/06 (2013.01); C08G 77/14 (2013.01); C08L 2205/025 (2013.01); C08L 2312/06 (2013.01); C09J 2483/005 (2013.01)

(58) Field of Classification Search
CPC ... C09J 7/0228; C09J 2483/005; C08L 83/05; C08L 2312/06; C08L 2205/025; C08L 83/06; C08K 5/0025; D21H 25/06; D21H 19/32; C08G 77/14

See application file for complete search history.

(56) References Cited

U.S. PATENT DOCUMENTS

| | | | |
|---|---|---|---|
| 3,981,897 A | 9/1976 | Crivello | |
| 4,954,364 A | 9/1990 | Stein et al. | |
| 4,994,299 A | 2/1991 | Stein et al. | |
| 5,085,924 A | 2/1992 | Eckberg | |
| 5,247,108 A | 9/1993 | Hirai et al. | |
| 5,340,898 A | 8/1994 | Cavezzan et al. | |
| 5,364,888 A * | 11/1994 | Aoki | C08K 5/06 522/170 |
| 5,397,813 A * | 3/1995 | Eckberg | C09D 183/06 522/170 |
| 6,589,659 B1 | 7/2003 | Imai et al. | |
| 6,875,795 B2 | 4/2005 | Irifune | |
| 8,211,547 B2 * | 7/2012 | Irifune | C08G 77/14 428/452 |
| 8,367,212 B2 * | 2/2013 | Irifune | C08G 59/3254 428/447 |
| 2003/0232900 A1 | 12/2003 | Irifune | |
| 2010/0120975 A1 * | 5/2010 | Kuroda | C08G 59/306 524/588 |
| 2010/0147457 A1 | 6/2010 | Mirou | |

FOREIGN PATENT DOCUMENTS

| | | |
|---|---|---|
| EP | 0 404 029 A1 | 12/1990 |
| EP | 0 464 706 A1 | 1/1992 |
| EP | 0880954 A1 | 12/1998 |
| EP | 2 107 085 A1 | 10/2009 |
| JP | S50151997 A | 12/1975 |
| JP | H06-028921 A | 2/1994 |
| JP | H617447 | 3/1994 |
| JP | H649848 | 6/1994 |
| JP | 2623426 B2 | 6/1997 |
| JP | H11104166 A | 4/1999 |
| JP | 2987524 B2 | 12/1999 |
| JP | 3384268 B2 | 3/2003 |
| JP | 3638850 B2 | 4/2005 |
| JP | 3993533 B2 | 10/2007 |
| JP | 5081826 B2 | 11/2012 |

OTHER PUBLICATIONS

English-language abstract of Japanese-language patent document JPH0628921, downloaded from Espacenet on Jul. 20, 2017, 1 page.*
Jul. 13, 2015 Extend Search Report issued in European Patent Application No. 15157406.8.

* cited by examiner

Primary Examiner — Nicholas Hill
(74) Attorney, Agent, or Firm — Oliff PLC

(57) ABSTRACT

To provide a radiation-curable silicone composition which provides a cured product whose odor is decreased, particularly is odorless, and has excellent curability and releasing properties. A radiation-curable silicone composition including the following components (A) and (B): (A) an epoxy group-containing cation-polymerizable organopolysiloxane which is represented by the following average composition formula (1): $R^1_a R^2_b SiO_{(4-a-b)/2}$ (1) and (B) an iodonium salt having a cation moiety represented by the following general formula (2) in an effective amount to cure said component (A), $[(R^3)—I—(R^3)]^+$ (2) wherein $R^3$ is, independently of each other, a substituted or unsubstituted monovalent aromatic hydrocarbon group having 15 to 26 carbon atoms, wherein said component (A) may be accompanied by any other compounds volatilizing during heating at 105 degrees C. for 3 hours, a content of said compounds is at most 2.0 mass %, based on a total amount of component (A) and said compound.

9 Claims, No Drawings

RADIATION-CURABLE SILICONE COMPOSITION

CROSS REFERENCE

This application claims the benefits of Japanese Patent application No. 2014-042886 filed on Mar. 5, 2014, the contents of which are hereby incorporated by reference.

FIELD OF THE INVENTION

The present invention relates to a radiation-curable silicone composition which provides an article having releasing properties.

BACKGROUND OF THE INVENTION

There are various methods for curing a silicone composition, including a condensation reaction catalized by organic metal compounds, a vulcanization catalized by organic peroxides and a hydrosilylation catalized by platinum group metal catalysts. However, these curing methods need heating. It is desired to improve productivity and to save energy that curing takes place at room temperature.

In recent years, curing with radiation draws attention as a method for providing an energy for curing without heating. This curing method includes polymerization of acrylic compounds by a radical polymerization, and an ene-thiol reaction. Particularly, a cation-polymerizable organopolysiloxane which is cured via a ring-opening reaction of epoxy group with generation of an acid does not receive inhibition of its curing by oxygen, and a cation-polymerizable organopolysiloxane is convenient and has good handling property, so that the applications are expanding. Further, the cation-polymerizable organopolysiloxane does not need a heat for a curing reaction and, therefore, can be applied on film substrates which have poor heat resistance. Therefore, the cation-polymerizable organopolysiloxane is used as a backside-treating agent of adhesive tapes, a coating agent for release paper for adhesive labels and a coating agent for fixing fastener tapes.

Japanese Patent Application Laid-Open No. Sho 50-151997 and Japanese Patent Nos. 2623426, 3384268 and 3993533 describe compositions comprising an epoxy group-containing cation-polymerizable organopolysiloxane and a photoacid generator which causes generation of acid by radiation, as a composition which cures by cation polymerization.

Further, cation-polymerizable organopolysiloxanes are used as a releasing agent for adhesive tapes of sanitary supplies such as sanitary napkins and disposable diapers. The sanitary napkin and the disposable diaper are individually packaged in view of usability and sanitation. Particularly, an individual packaging film for a sanitary napkin has a film, such as a polyethylene film, which is provided with a releasing agent. The film provided with a releasing agent is attached on an adhesive layer of a main body of the napkin, which adhesive layer fixes the napkin on an underwear and, then, the napkin is wrapped and packaged. The radiation-curable silicone composition is often used as the releasing agent.

Japanese Patent No. 2987524 describes an invention for a sanitary napkin and a sheet for individually packaging a sanitary napkin wherein a release agent layer is formed on one side of a base material. The aforesaid release agent layer is obtained by curing a release agent mainly comprising an epoxy-functional polyorganosiloxane with ultraviolet irradiation, and the epoxy-functional polyorganosiloxane has 1 to 20 mole % of a monovalent epoxy-functional organic group, relative to a total mole of the organic groups. Even if this sheet for individually packaging sanitary napkins is exposed to a light source such as the sun or a fluorescent before used, the force needed for releasing the sheet from the adhesive layer does not increase, and the sheet can be easily peeled from the napkin when it is used.

Japanese Patent No. 3638850 describes a sheet having a high antistick effect against dirt, wherein a layer of a first silicone compound is formed on a surface of a base sheet, and a layer of a second silicone compound whose surface tension is lower than that of the first silicone compound is further formed on the surface of the layer of the first silicone compound. Thus, this sheet is coated with the two silicone compounds which have different surface tensions to form a sheet having a multi-layer construction and a high effect of antistick effect against dirt.

The sanitary napkin is often provided a smell with a perfume, but customers diversify in the recent years and, therefore, a request for an odorless sanitary napkin is increasing. Therefore, a main part of the napkin and an adhesive layer are needed to be odorless and, further, an individual packaging film provided with a releasing agent, which is released before using the main part of the napkin, is also needed to be odorless because the individual packaging film is also touched with a customer. When a composition comprising a cation-polymerizable organopolysiloxane and a photoacid generator is used as a radiation-curable silicone composition to form a cured product, odor of an epoxy group as the cation-polymerizable group and odor of a photoacid generator as a curing catalyst tend to remain a little. However, none of the aforesaid patent literatures mention odor of the silicone layer.

Japanese Patent Application Laid-Open No. Hei 11-104166 describes a releasing film for individual packaging of sanitary goods, wherein at least one surface of a synthetic resin film is release treated and an adhesive surface is exposed in air. The releasing layer is composed of a releasing agent made by curing a photo-curing composition containing an epoxy-modified silicone and an optical cation-polymerization initiator. In this film, odor is avoided by the use of the cation-polymerizable organopolysiloxane in the releasing agent. However, the cation-polymerizable organopolysiloxane is not specified and, therefore, odor of an epoxy group and odor of a photoacid generator are not completely prevented. Decrease of odor from the film is not sufficient.

Thus, almost no invention is known for decrease of odor of a releasing layer of an individual packaging of a sanitary napkin.

Regarding an invention for decreasing odor of a cation-polymerizable organopolysiloxane composition, Japanese Examined Patent Publication No. Hei 6-49848 describes an ultraviolet-curable organopolysiloxane release coating composition, which is substantially odorless. The composition comprises (A) a poly(epoxy haloaryl alkyl siloxane) selected from the group consisting of (i) an epoxy haloaryl alkyl siloxane consisting essentially of approximately 20 to 100 condensation siloxy units selected from diorganosiloxy units represented by $(R)_2SiO$, epoxyorganosiloxy units represented by $RR^1SiO$ and haloaryl alkyl siloxy units represented by $RR^2SiO$, and (ii) a blend of the component (i) and an epoxy siloxanes consisting essentially of approximately 20 to 100 condensation siloxy units selected from approximately 88 to 99 mole % of diorganosiloxy units and approximately 5 to 12 mole % of epoxy organosiloxy units, and components (i) or (ii) is present in amounts enough to provide approximately 76 to 94 mole % of diorganosiloxy units, approximately 5 to 12 mole % of epoxyorganosiloxy units and approximately 1 to 12 mole % of haloaryl alkylsiloxy units, and (B) an effective amount of a polyaryl onium hexafluorometalloid salt selected from a diarylidonium salt and a triarylsulfonium salt.

An epoxy group-containing organopolysiloxane having a monovalent phenol group is known as a release-adjusting agent. It was confirmed that the epoxy group-containing organopolysiloxane had odor of allylphenol remaining in the siloxanes. Patent Literature 8 describes that odor is prevented by the use of a compound having a methyl-chlorophenyl ethyl siloxy unit and a methylepoxy cyclohexyl siloxy unit as the release-adjusting agent.

Japanese Examined Patent Publication No. Hei 6-17447 describes a method for providing a controlled releasing property on paper or a plastic substrate. This method comprises steps of (A) paper or a plastic substrate is treated with an ultraviolet-curable epoxy silicone mixture, and (B) the treated substrate is subjected to curing with ultraviolet to form a tack-free adhesive film having no stain, wherein the ultraviolet-curable epoxy silicone mixture comprises (C) 100 parts by weight of an epoxy silicone comprising 5 to 12 mole % of condensation epoxy organo siloxy units, based on total moles of the condensation diorganosiloxy units (D) an effective amount of a photosensitive polyaryl onium hexafluorometalloid salt, and (E) 0.1 to 50 parts by weight of one kind of a the specific additive selected from the group consisting of (1) alkyl phenols having 8 to 20 carbon atoms and (ii) phenol alkyl-substituted organodisiloxanes.

Japanese Patent No. 5081826 describes a method for preparing a silicone release coating on a base material.

The method comprises (a) a step of preparing a silicone coating composition which cross-links and/or polymerizes with irradiation of short wave ultraviolet (UV-C) having a wavelength in a range of 200 and 280 nm;

(b) a step of coating a base material with the aforesaid silicone coating composition; and (c) a step of irradiating the aforesaid base material coated with the aforesaid silicone coating composition with at least one low-pressure lamp which emits false monochromatic light in the aforesaid UV-C region to polymerize the composition, wherein the aforesaid composition comprises (A) at least one of liquid polyorganosiloxane monomer, oligomer and/or polymer A, which have a viscosity of approximately 10 to 10000 mPa·s at 25 degrees C. and comprises at least one functional group, Fa, which cross-links and/or polymerizes via a cation route, and (B) an effective amount of a cationic photoinitiator or a radical photoinitiator, which are active under the aforesaid UV-C radiation, wherein the functional group, Fa, is selected from the group consisting of epoxy, oxetane and dioxisoran functional groups.

PRIOR LITERATURES

Patent Literature 1: Japanese Patent Application Laid-Open No. Sho 50-151997

Patent Literature 2: Japanese Patent No. 2623426
Patent Literature 3: Japanese Patent No. 3384268
Patent Literature 4: Japanese Patent No. 3993533
Patent Literature 5: Japanese Patent No. 2987524
Patent Literature 6: Japanese Patent No. 3638850
Patent Literature 7: Japanese Patent Application Laid-Open No. Hei 11-104166
Patent Literature 8: Japanese Examined Patent Publication No. Hei 6-49848
Patent Literature 9: Japanese Examined Patent Publication No. Hei 6-17447
Patent Literature 10: Japanese Patent No. 5081826

SUMMARY OF THE INVENTION

Problems to be Solved by the Invention

However, chlorostylene which has odor is used in a synthesis of the release adjusting agent described in Patent Literature 8. Chlorostylene has a boiling point of approximately 200 degrees C. and tends to remain in the composition. Further, Patent Literature 8 does not mention decrease of odor of the epoxy group-containing organopolysiloxane itself and odor of the photoacid generator and there is a need to make a composition odorless.

The alkylphenol having 8 to 20 carbon atoms used as (i) the additive, i.e. the release adjusting agent, described in Patent Literature 9 has odor of a phenol. Therefore, it has a need to make a composition odorless. Further, nonylphenol which is one of the alkylphenols is designated as a chemical material which is suspected to have an endocrine disruption action by the Ministry of the Environment. Thus, compositions comprising alkylphenol have a problem of safety. Further, Patent Literature 9 describes that the phenol alkyl-substituted organodisiloxane (ii) is purified by distillation to remove a raw material allylphenol which causes odor, so that, odor is prevented. This method is effective to decrease odor of release adjusting agent. However, Patent Literature 9 does not mention about decrease of the odor of the epoxy group-containing organopolysiloxane as a base polymer nor decrease of the odor of the photoacid generator. Therefore, a need to make a composition odorless remains.

Patent Literature 10 describes that when use is made of a short wave ultraviolet (UV-C) having wavelength in a range of 200 and 280 nm of a low-pressure lamp, the cured coating obtained is odorless. However, high-pressure lamps are mostly used as a source for curing a cation-polymerizable organopolysiloxane. Then, the effect in Patent Literature 10 is not fully attained. Further, Patent Literature 10 does not mention about decrease of odor of the cation-polymerizable organopolysiloxane and odor of the photoacid generator.

One of the purposes of the present invention is to provide a radiation-curable silicone composition which provides a cured product whose odor is decreased, particularly is odorless, and has excellent curability and releasing properties.

Means to Solve the Problems

The inventors have found that a composition comprising an epoxy group-containing cation-polymerizable organopolysiloxane which is accompanied by a compound volatilizing during heating at 105 degrees C. for 3 hours and wherein a content of the compound is lower than the specific amount, and an iodonium salt having a monovalent aromatic hydrocarbon group having specific carbon atoms in a cation moiety provide a cured product whose odor is decreased and solves the aforesaid problems.

Thus, the present invention provides a radiation-curable silicone composition comprising the following components (A) and (B):

(A) an epoxy group-containing cation-polymerizable organopolysiloxane which is represented by the following average composition formula (1):

wherein $R^1$ is, independently of each other, an epoxy group-containing monovalent organic group, $R^2$ is, independently of each other, a substituted or unsubstituted monovalent hydrocarbon group having 1 to 10 carbon atoms, a>0, b>0 and a total of a and b is in a range of larger than 0 and at most 3, and (B) an iodonium salt having a cation moiety represented by the following general formula (2) in an effective amount to cure said component (A),

wherein $R^3$ is, independently of each other, a substituted or unsubstituted monovalent aromatic hydrocarbon group having 15 to 26 carbon atoms, wherein said component (A) may be accompanied by any other compounds volatilizing during heating at 105 degrees C. for 3 hours, a content of said compounds is at most 2.0 mass %, based on a total amount of component (A) and said compound.

Further, the present invention provides an article having a substrate, which has on its surface a cured product obtained by curing the aforesaid radiation-curable silicone composition, so that the surface has good releasing properties.

In the present invention, an article having a releasing property means that a substrate of the article has a cured product having releasing property on its surface. A releasing property means that a substrate is separated from an adhesive with no remaining additive. In the present invention, a releasing property includes a release with less force and a release with strong force. The release with less force means that a force needed for releasing the substrate from the adhesive material is small and the release with strong force means that a force needed for releasing the substrate from the adhesive material is large.

Effects of the Invention

The odor of an epoxy group-containing organopolysiloxane and the odor of a photoacid generator are prevented in the present radiation-curable silicone composition. Therefore, the present radiation-curable silicone composition provides a cured silicone product whose odor is decreased, particularly is odorless, and has excellent curability and releasing properties. The present radiation-curable silicone composition may provide cured products with various releasing properties such as a release with strong force and a release with less force. The force is needed for releasing the cured product from an adhesive. Accordingly, the present silicone composition is usable for preparing articles with various releasing properties.

BEST MODE OF THE INVENTION

The present invention will be described below in detail.
(A) Epoxy Group-Containing Cation-Polymerizable Organopolysiloxane The epoxy group-containing cation-polymerizable organopolysiloxane may be prepared, for instance, by a hydrosilylation of a hydrogen organopolysiloxane and an alkenyl group-containing epoxy compound in the presence of a metal catalyst, as described in Japanese Patent Nos. 3384268 and 3993533. In the hydrosilylation, a solvent and volatile compounds are removed by vacuum distillation under heating. However, the unreacted starting alkenyl group-containing epoxy compound, and a compound formed by a reaction of a low molecular weight siloxane present in the starting hydrogenorganopolysiloxane with the alkenyl group-containing epoxy compound tend to remain in the cation-polymerizable organopolysiloxane obtained. Such compounds, i.e. volatile low molecular weight compounds, would be a cause of odor in the cation-polymerizable organopolysiloxane.

The present invention is characterized in that an amount of compounds volatilizing during heating at 105 degrees C. for 3 hours, by which component (A) is accompanied, is at most 2.0 mass %, preferably at most 1.8 mass %, more preferably at most 1.5 mass %, based on a total amount of said compounds and component W. The amount of the compounds volatilizing during heating at 105 degrees C. for 3 hours is near to the amount of odor components contained in the cation-polymerizable organopolysiloxane. Therefore, odor of a cured product is decreased by lowering the amount of the compounds volatilizing during heating at 105 degrees C. for 3 hours to the aforesaid range. Examples of the compounds volatilizing during heating at 105 degrees C. for 3 hours include a low molecular weight organopolysiloxane having an epoxy group. The low molecular weight organopolysiloxane here has a degree of polymerization is 8 or lower, particularly 7 or lower, and may be a linear, branched or cyclic. Further, the staring alkenyl group-containing epoxy compound is also an example. There is no lower limit for the amount of the volatile compounds. A smaller amount gives a less odor product. If the amount of the volatile compounds is larger than the upper limit, the volatile compounds cause much odor and an odorless product cannot be obtained.

The amount of the compounds volatilizing during heating at 105 degrees C. for 3 hours, by which the epoxy group-containing cation-polymerizable organopolysiloxane is accompanied, is determined with an air-blowing thermostat oven. Specifically, 2 grams of the epoxy group-containing cation-polymerizable organopolysiloxane (hereinafter referred to as "sample") is put into a 50-milliliter beaker and then, the beaker is left in an air-blowing thermostat oven which is set at 105 degrees C. After 3 hours, the beaker is took out, cooled in a desiccator and, then, weighed to record a decreased amount of the sample. A mass of the components which volatilized during heating is calculated as a percentage, based on the mass of the sample in the beaker before heating. The air-blowing thermostat oven used in the present invention is DN-610H, ex Yamato Scientific Co., Ltd. The rate of air is 12.3 m³/min, the internal volume of the thermostat oven is 223 liters, the internal dimensions is 620×600×600 mm, and there are two exits having an inner diameter of 30 mm in the back. The 50-milliliter beaker has a product code 010020-5051A, ex Sibata Scientific Technology Ltd. (HARIO CO., LTD.), with an outer diameter of 46 mm and a height of 61 mm. When the epoxy group-containing cation-polymerizable organopolysiloxane is left in the air-blowing thermostat oven, volatile low molecular weight compounds volatilize, which have a boiling point of higher than 105 degrees C., for instance a compound having a boiling point of 200 degrees C.

Component (A) is an epoxy group-containing cation-polymerizable organopolysiloxane represented by the following average composition formula (1):

$$R^1{}_a R^2{}_b SiO_{(4-a-b)/2} \quad (1)$$

wherein $R^1$ is, independently of each other, an epoxy group-containing monovalent organic group, $R^2$ is, independently of each other, a substituted or unsubstituted monovalent hydrocarbon group having 1 to 10 carbon atoms, a is larger than 0, b is larger than 0 and a total of a and b is larger than 0 and at most 3. Component (A) is accompanied by components volatilizing during heating at 105 degrees C. for 3 hours. A content of the compounds is at most 2.0 mass %, preferably at most 1.8 mass %, more preferably at most 1.5 mass %, based on a total amount of the compounds and component (A).

In the average composition formula (1), $R^1$ is, independently of each other, an epoxy group-containing monovalent organic group. Examples of the epoxy group-containing monovalent organic group include a glycidoxyalkyl group, an epoxycyclohexylalkyl group, and an oxiranyl alkyl group, which have 3 to 20 carbon atoms, preferably 3 to 16 carbon atoms, more preferably 4 to 10 carbon atoms. In particular, the groups represented by the following formulas are preferable.

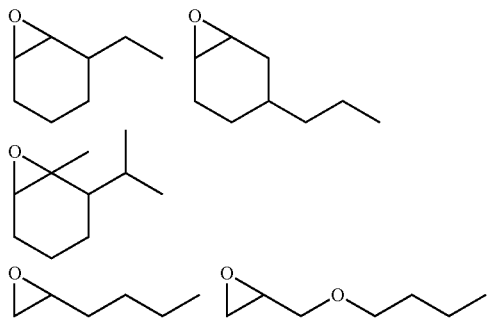

In the average composition formula (1), $R^2$ is, independently of each other, an unsubstituted or substituted monovalent hydrocarbon group having 1 to 10 carbon atoms. Examples of $R^2$ include alkyl groups such as a methyl group, an ethyl group, a propyl group, a butyl group, cyclo alkyl groups such as a cyclohexyl group, aryl groups such as a phenyl group and a tolyl group, and those groups where a part or the whole of their hydrogen atoms are replaced with a hydroxy group, a cyano group or a halogen atom(s), such as a hydroxypropyl group, a cyanoethyl group, a 1-chloropropyl group, and a 3,3,3-trifluoropropyl group. Among these, alkyl groups and aryl groups are preferable in view of the releasing property of the cured product. Further, 80 mole % or more of a total mole of $R^2$ groups is preferably a methyl group.

In the average composition formula (1), a is larger than 0, b is larger than 0 and a total of a and b is larger than 0 and at most 3. The structure of the organopolysiloxane represented by the aforesaid average composition formula (1) is not limited to any particular one and may be a linear, branched, cyclic or three-dimensional by crosslinked structure. In particular, a linear or branched structure is preferable. The organopolysiloxane may be one kind or a combination of two or more kinds of such. Component (A) has an average epoxy equivalent of 600 to 2,500 g/mol and a viscosity of 5 to 1,000,000 mPa·s. Further preferably, the average epoxy equivalent is 650 to 2,300 g/mol and a viscosity is 10 to 100,000 mPa·s. The viscosity is determined with a rotational viscometer at 25 degrees C.

If the average epoxy equivalent is smaller than the aforesaid lower limit, the cured product obtained from the composition may have a release with strong force. Further, the content of the epoxy group is large, so that odor of the epoxy group tends to be strong. If the average epoxy equivalent is larger than the aforesaid upper limit, the odor of the epoxy group is weak, but the curability tends to significantly worsen because of the smaller amount of epoxy group. If the viscosity of component (A) is smaller than the aforesaid lower limit, it may be difficult to apply the composition without a solvent. If the viscosity is larger than the aforesaid upper limit, the viscosity of the composition is too high and it may be difficult to handle the composition.

Preferably, component (A) is at least one selected from organopolysiloxanes (A1) to (A3), represented by the following average formula (3), (4) or (5), respectively.

Epoxy group-containing cation-polymerizable organopolysiloxane (A1):

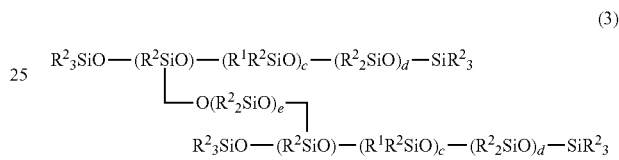

Epoxy group-containing cation-polymerizable organopolysiloxane (A2):

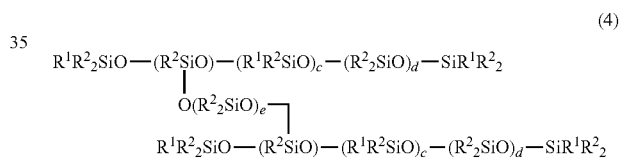

Epoxy group-containing cation-polymerizable organopolysiloxane (A3):

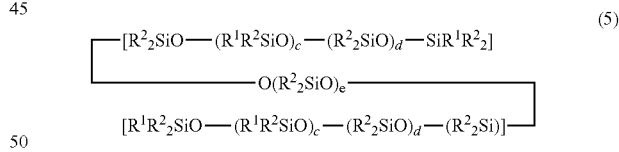

In the average formulas (3) to (5), $R^1$ and $R^2$ are as defined above. c is, independently of each other, a positive number of 2 or larger, d is, independently of each other, 0 or a positive number, and e is a positive number of 2 or larger. Component (A) may be one of or a mixture of two or more of the organopolysiloxanes (A1) to (A3). The upper limits of c, d and e are not limited to any particular ones. c, d and e are preferably such that the average epoxy equivalent of the organopolysiloxanes (A1) to (A3) is 600 to 2,500 g/mol and a viscosity of the organopolysiloxanes (A1) to (A3) is 5 to 1,000,000 mPa·s. Further preferred is that the average epoxy equivalent is 650 to 2,300 g/mol and the viscosity is 10 to 100,000 mPa·s. The viscosity of the organopolysiloxane is determined with a rotational viscometer at 25 degrees C. When component (A) is a mixture of two or more of the organopolysiloxanes (A1) to (A3), the aforesaid average epoxy equivalent is an average one of the mixture and the aforesaid viscosity is the viscosity of the mixture.

If the average epoxy equivalent is smaller than the aforesaid lower limit, the cured product obtained from the composition may have a release with strong force. Further, the content of the epoxy group is larger, so that odor of the epoxy group tends to be strong. If the average epoxy equivalent is larger than the aforesaid upper limit, the odor of the epoxy group is weak, but the curability tends to significantly worsen because of the smaller amount of epoxy group. If the viscosity is smaller than the aforesaid lower limit, it may be difficult to apply the composition without a solvent. If the viscosity is larger than the aforesaid upper limit, the viscosity of the composition is too high and it may be difficult to handle the composition.

The composition (A) may comprise component (A4) represented by the following average formula (6) and component (A5) represented by the following average formula (10) or (11). A weight ratio of component (A4) to component (A5) is 0.1 to 1.5, preferably 0.3 to 1.2. A mixture of components (A4) and (A5) may work as a release adjusting agent, in particular an additive for a release with strong force.

Epoxy Group-Containing Cation-Polymerizable Organopolysiloxane (A4):

$$(R^2{}_3SiO_{1/2})_f(SiO_{4/2})_g(XO-SiO_{3/2})_h \quad (6)$$

Epoxy group-containing cation-polymerizable organopolysiloxane (A5):

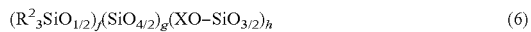

(10)

(11)

In the average formula (6), $R^2$ is as defined above. f, g, and h are positive numbers satisfying the equation $f/(g+h)=$ 0.5 to 2, preferably $f/(g+h)=$0.6 to 1.3. If the value of $f/(g+h)$ is smaller than the aforesaid lower limit, the viscosity of a mixture of components (A4) and (A5) increases and it is difficult to use. If the value of $f/(g+h)$ is larger than the aforesaid upper limit, the effect of attaining a release with strong force is small, which is not preferable.

In the average formula (6), X is, independently of each other, a hydrogen atom or a group represented by the following formula (7), (8) or (9). Preferred is that at least one of X is any one of the following formulas (7), (8) and (9), in particular, the formula (7).

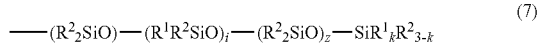 (7)

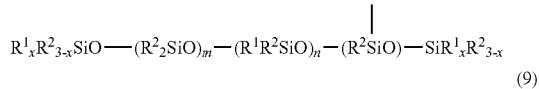 (8)

 (9)

In the aforesaid formulas (7) to (9), $R^1$ and $R^2$ are as defined above, i, z, m, n and o are, independently of each other, 0 or a positive number, p is a positive number of 1 or larger, provided that a total of i and z is 1 to 50, a total of m and n is 1 to 50, and a total of o and p is 2 to 7, and k and x are, independently of each other, 0, 1, 2 or 3, provided that a total of i and k is 1 or larger and a total of n and x is 1 or larger. Preferably, k and x are, independently of each other, 0 or 1, a total of i and k is 2 or larger, a total of n and x is 2 or larger, p is 2 or larger, a total of i and z is 1 to 40, a total of m and n is 1 to 40, a total of o and p is 2 to 6. If the total of i and k, the total of n and x, or p is smaller than 1, the amount of the epoxy group is smaller and, therefore, the curability of the composition is poor. If the total of i and z, or the total of m and n is smaller than the aforesaid lower limit, it is difficult to synthesize such organopolysiloxane. If the total of i and z, or the total of m and n is larger than the aforesaid upper limit, the viscosity of the mixture becomes too high and it is difficult to handle it.

In the average formulas (10) and (11), $R^1$ and $R^2$ are as defined above, r, s, and t are, independently of each other, 0 or a positive number, u is a positive number of 1 or larger, provided that a total of r and s is 3 to 55, a total of t and u is 3 to 8, q is 0, 1, 2 or 3, provided that s and q are not zero at the same time. Preferably, q is 0 or 1, a total of r and s is 3 to 40, and a total of t and u is 3 to 7, provided that s and q are not zero at the same time. If the total of r and s is larger than the aforesaid upper limit, the viscosity of the mixture of components (A4) and (A5) is too high and it is difficult to handle.

In the mixture of the cation-polymerizable organopolysiloxane (A4) and (A5), an average epoxy equivalent of the organopolysiloxanes is preferably 600 to 2,500 g/mol and a viscosity of the mixture is preferably 5 to 1,000,000 mPa·s. Further preferably, the average epoxy equivalent of the mixture is 650 to 2,300 g/mol and the viscosity of the mixture is 10 to 100,000 mPa·s. The viscosity is determined with a rotational viscometer at 25 degrees C.

If the average epoxy equivalent is smaller than the aforesaid lower limit, the cured product obtained from the composition may have a release with strong force. Further, the content of the epoxy group is large, so that odor of the epoxy group tends to be strong. If the average epoxy equivalent is larger than the aforesaid upper limit, the odor of the epoxy group is weak, but the curability tends to significantly worsen because of the smaller amount of epoxy group. If the viscosity of mixture is smaller than the aforesaid lower limit, it may be difficult to apply the composition without a solvent. If the viscosity is larger than the aforesaid upper limit, the viscosity of the composition is too high and it may be difficult to handle the composition.

In a case where component (A) comprises at least one of components (A1) to (A3) as a base polymer and further comprises a mixture of components (A4) and (A5) as a release adjusting agent, the silicone composition provides a cured product having a release with strong force. That is, the cured product needs a large force to be peeled from an adhesive and, thus, has a large release resistance. When the amount of the mixture of components (A4) and (A5) is larger, the force needed for releasing is larger. In a case where component (A) does not comprise the mixture of components (A4) and (A5), the silicone composition provides a cured product having a release with less force. That is, the cured product can be peeled from an adhesive with a smaller force and, thus, the release resistance is small. Such cured products can be used in release paper. The present silicone composition may provide cured products which have various releasing properties of from a release with strong force to release with less force, by adjusting the amount of the mixture of components (A4) and (A5). When the silicone composition comprises the mixture of components (A4) and (A5) as a release adjusting agent, the amount of the mixture is not particularly limited and is preferably 10 to 90 mass %, more preferably 25 to 75 mass %, further preferably 40 to 60 mass %, based on the total mass of component (A). Further, component (A) may be composed only of a mixture of components (A4) and (A5).

The present silicone composition may comprise a mixture of the following component (C) which is an organopolysiloxane having no epoxy group and the aforesaid component (A5) or a mixture of the aforesaid components (A4) and (A5) and the component (C) as a release adjusting agent, in place of the aforesaid mixture of components (A4) and (A5).

The component (C) is an organopolysiloxane having no epoxy group, represented by the following average formula (6').

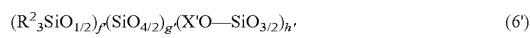

$(R^2{}_3SiO_{1/2})_{f'}(SiO_{4/2})_{g'}(X'O-SiO_{3/2})_{h'}$ (6')

In the average formula (6'), $R^2$ is as defined above. X' is, independently of each other, a hydrogen atom or a group represented by the following formula (7'), (8') or (9'). f', g', and h' are positive numbers satisfying the equation f'/(g'+h')=0.5 to 2, preferably f'/(g'+h')=0.6 to 1.3. If the value of f'/(g'+h') is smaller than the aforesaid lower limit, the viscosity of the mixture is larger and it is difficult to use. If the value of f'/(g'+h') is larger than the aforesaid upper limit, the effect of giving a release with strong force is smaller, which is not preferable. In the formula (6'), X' is preferably a hydrogen atom.

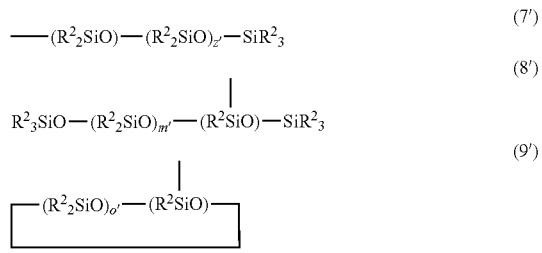

In the formula (7') to (9'), $R^2$ are as defined above, z' is a positive number of 1 to 50, m' is a positive number of 1 to 50, and o' is a positive number of 2 to 7.

In a case where the release adjusting agent is a mixture of component (C) and component (A5), a weight ratio of component (C) to component (A5) is 0.1 to 1.5, preferably 0.3 to 1.2. The total amount of components (C) and (A5) is 1 to 100 parts by mass, preferably 10 to 90 parts by mass, more preferably 25 to 75 parts by mass, further preferably 40 to 60 parts by mass, relative to a total 100 parts by mass of components (A) and (C).

In a case where the release adjusting agent is a mixture of components (A4) and (A5) and component (C), a weight ratio of components (A4) and (C) to component (A5) is 0.1 to 1.5, preferably 0.3 to 1.2. The total amount of components (A4), (C) and (A5) is 1 to 100 parts by mass, preferably 10 to 90 parts by mass, more preferably 25 to 75 parts by mass, further preferably 40 to 60 parts by mass, relative to a total 100 parts by mass of components (A) and (C). The ratio of component (A4) to component (C) is not limited to any particular one.

A method for making the content of the aforesaid volatile compounds, mass %, to the upper limit or less in the epoxy group containing cation-polymerizable organopolysiloxane is not limited to any particular one. For instance, stripping may be used. The stripping conditions may be selected according to the conventional manners so as to making a content, mass %, of the volatile compounds in the organopolysiloxane to less than the upper limit.

(B) Photoacid Generator

Component (B) is an iodonium salt having a cation moiety represented by the following general formula (2). The ionium salt is a photoacid generator and works as a catalyst for curing component (A) with a radiation. Component (B) is characterized in that $R^3$ in the following general formula (2) is a substituted or unsubstituted, monovalent aromatic hydrocarbon atom having 15 to 26 carbon atoms.

$[(R^3)-I-(R^3)]^+$ (2)

In the formula (2), $R^3$ is, independently of each other, a substituted or unsubstituted monovalent aromatic hydrocarbon atom having 15 to 26 carbon atoms, preferably 16 to 24 carbon atoms. Examples of $R^3$ include aromatic hydrocarbon groups such as a nonylphenyl group, a decylphenyl group, an undecylphenyl group, a dodecylphenyl group, a tridecylphenyl group, a tetradecylphenyl group and a pentadecylphenyl group, and those groups where a part or the whole of their hydrogen atoms bonded to carbon atoms are replaced with a hydroxy group, a cyano group or a halogen atom(s), such as a hydroxypropylphenyl group, a cyanoethylphenyl group, a 1-chloropropylphenyl group, and a 3,3,3-trifluoropropylphenyl group. In particular, a part or the whole of hydrogen atoms bonded to carbon atoms of the aromatic hydrogen group may be preferably replaced with a linear or branched alkyl group having 9 to 20 carbon atoms. For instance, preferred are a decylphenyl group, an undecylphenyl group, a tridecylphenyl group, a tetradecylphenyl group and a pentadecylphenyl group.

If the number of the carbon atoms of $R^3$ is smaller than the aforesaid lower limit, an alkylbenzen iodide and an alkylbenzen, which generate in decomposition of the photoacid generator, volatilize easily and, therefore, odor tends to cause from a cured product obtained by curing the silicone composition. If the number of carbon atoms of $R^3$ is larger than the upper limit, no further increased effect of decreasing odor is attained.

Regarding the catalyst activity of the photoacid generator, if the number of carbon atoms of $R^3$ is smaller than the lower limit, the activation by radiation absorption is lower, so that the curability of the composition decreases. If the number of carbon atoms of $R^3$ is larger than the upper limit, no further increased activation by radiation absorption is attained.

Sulfonium salts are known as a photoacid generator. However, a sulfur atom is liberated from the sulfonium salts in decomposition. Therefore, a cured product obtained has odor of the sulfur atom, so that sulfonium salts is not suitable in the present invention.

As mentioned above, component (B) is characterized in that the iodonium salt has the aforesaid cation moiety. An anion moiety may have any moiety as long as the iodonium salt having its moiety works as a photoacid generator. In view of the curability and solubility in the cation-polymerizable organopolysiloxane, preferred are selected from the group consisting of $SbF_6^-$, $[B(C_6F_5)_4]^+$, $[B(C_6H_4CF_3)_4]^-$, $[(C_6F_5)_2BF_2]^-$, $[C_6F_5BF_3]^-$, $[B(C_6H_3F_2)_4]^-$, $[(CF_3CF_2)_3PF_3]^-$, $[(CF_3CF_2CF_2)_3PF_3]^-$, $[((CF_3)_2CF)_3PF_3]^-$, $[((CF_3)_2CF)_2PF_4]^-$, $[((CF_3)_2CFCF_2)_3PF_3]^-$ and $[((CF_3)_2CFCF_2)_2PF_4]^-$.

Examples of component (B) include bis(alkyl phenyl) iodonium hexafluoroantimonate, bis(alkyl phenyl) iodonium tetrakis(pentafluorophenyl) borate and bis(alkyl phenyl)

iodonium tris(pentafluoroethyl)trifluorophosphate. The alkyl group is preferably a linear or branched alkyl group having 9 to 20 carbon atoms, more preferably 9 to 15 carbon atoms. They may be used alone or a combination of two or more of them. Component (B) may be solved in a solvent such as isopropyl alcohol.

The amount of component (B) may be an effective amount to work as a photoacid generator. That is, the amount may be enough to cure component (A) with radiation and is not limited particularly. In particular, the amount is preferably 0.05 to 20 parts by mass, more preferably 0.1 to 10 parts by mass, relative to a total 100 parts by mass of component (A) and any other compound volatilizing during heating at 105 degrees C. for 3 hours.

The present silicone composition is applied on various substrates, then cured with radiation to form a cured film having a release property so as to provide a releasing property on a surface of the substrate. Thus, release paper and release films are prepared. The substrate is not limited to any particular one and the present composition is used to various general purpose substances. Examples of the substrate include glassine paper, clay coated paper, fine paper, polyethylene laminated paper, plastic film, and transparent resins such as polycarbonate. In particular, the present composition is applied on polyethylene films, polypropylene films and polyester films which are to be processed into individual packaging films for sanitary supplies such as sanitary napkin and disposable diapers.

A method for applying the present silicone composition on the substrate is not particularly limited. For instance, any known manners such as roll coating, gravure coating, wire doctor coating, air-knife coating and dipping coating may be used. The amount applied may be decided depending on a purpose of use. For instance, the amount applied may be 0.01 to 3.0 g/m$^2$. The coating is easily cured with radiation.

The present silicone composition is prepared by mixing the aforesaid components (A) and (B). The silicone composition may further comprise optional materials other than components (A) and (B). Examples of the optional materials include additives such as fillers, antistatic agents, flame retarders, defoaming agents, fluidity modifiers, light stabilizers, solvents, non-reactive resins and radical-curable compounds. The amount of optional components may be according to conventional manners and selected so that the effects of the present invention are not obstructed.

The present silicone composition is cured by irradiation of a radiation energy ray. Any radiation energy ray which has an energy enough to induce decomposition of the photoacid generator (B) may be used. Preferred are such emitted by a high-pressure or ultra-high-pressure mercury lamp, a metal halide lamp, a xenon lamp, a carbon ark lamp, a fluorescent, a semiconductor or solid-state laser, an argon laser, He—Cd laser, KrF excimer laser, ArF excimer laser and F2 laser. Preferred is an energy ray in a range of from ultraviolet to visible light of approximate 100 to 800 nm. In particular, a radiation source having a strong light intensity in a region of 200 and 400 nm is preferable. Alternatively, a radiation having a high energy such as an electron ray and an X-ray may be used. A time for irradiation of the radiation energy may be usually 0.1 to 10 seconds at room temperature. When transmittance of the energy ray is low or the coating obtained from the silicone composition is thick, the irradiation time may be longer than the aforesaid time. If needed, after the irradiation with the energy ray, the silicone composition may be heated at room temperature to 150 degrees C. for a few seconds to a few hours to after cure.

An energy of 5 to 500 mJ/cm$^2$ of a radiation a wavelength of 254 nm is effective, preferably 10 to 450 mJ/cm$^2$, further preferably 15 to 400 mJ/cm$^2$. If the amount of energy is smaller than the aforesaid lower limit, the silicone composition is not cured sufficiently. If the amount of the energy is larger than the aforesaid upper limit, no further increased curability is confirmed.

EXAMPLES

The present invention will be explained in detail by reference to the Examples and the Comparative Examples, but shall not be limited thereto. In the following descriptions, the viscosity was determined with a rotational viscometer at 25 degrees C., and "Me" is an abbreviation for a methyl group and "Ep" is an abbreviation for an epoxy group-containing organic group represented by the following formula:

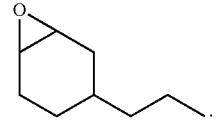

[Determination of a Content of Volatile Compounds]

In the following Examples and Comparative Examples, a content of a compound volatilizing during heating at 105 degrees C. for 3 hours, hereinafter referred to as "a content of volatile compound", by which an epoxy group-containing cation-polymerizable organopolysiloxane prepared is accompanied, was determined according to the following methods.

In a 50-milliliter beaker, were put 2 grams of an epoxy group-containing cation-polymerizable organopolysiloxane, (hereinafter referred to as a sample) and, then, the beaker was left in an air-blowing thermostat oven, ex Yamato Scientific Co., Ltd., which was set at 105 degrees C. After 3 hours, the beaker was took out and cooled in a desiccator and, then, weighed to record a decreased amount of the sample. A mass percentage of the components which volatilized during the heating was calculated, based on the mass of the sample in the beaker before the heating.

The air-blowing thermostat oven was DN-610H, ex Yamato Scientific Co., Ltd. The rate of air was 12.3 m$^3$/min, the internal volume of the thermostat oven was 223 liters, the internal dimensions 620×600×600 mm, and the inner diameter of the exits was 30 mm×2. The 50-milliliter beaker had a product code 010020-5051A, ex Sibata Scientific Technology Ltd. (HARIO CO., LTD.), with the outer diameter was 46 mm and the height was 61 mm.

Example 1

100 Parts by mass of component (A) and 2.0 parts by mass of a solution of component (B) were homogeneously mixed to obtain silicone composition 1. Component (A) was a mixture (a-1) of epoxy group-containing cation-polymerizable organopolysiloxanes each represented by the following average formulas (a-a) and (a-b), wherein an average epoxy equivalent of the mixture was 1100 g/mol, a content of volatile compounds was 1.2 mass %, and a viscosity at 25 degrees C. was 150 mPa·s.

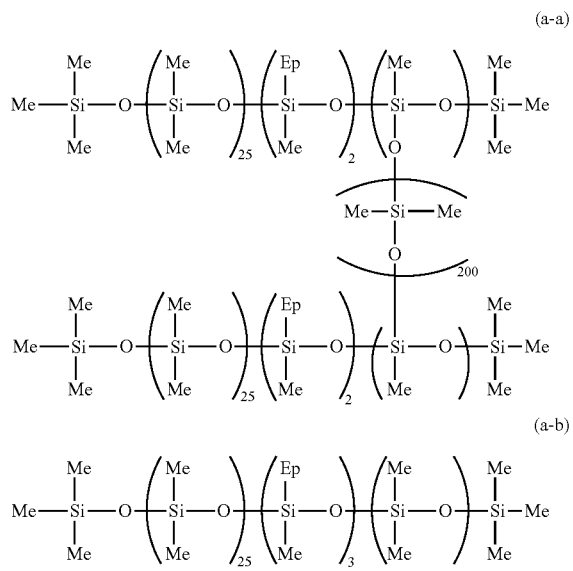

(a-a)

(a-b)

The solution of component (B) comprises 50 mass % of bis[4-n-alkyl (C10-13) phenyl]iodonium hexafluoroantimonate in 50 mass % of isopropyl alcohol, hereinafter referred to as photoacid generator b-1.

Example 2

The procedures of Example 1 were repeated to obtain silicone composition 2, except that a 50 mass % solution of bis[4-n-alkyl (C10-13) phenyl]iodonium tetrakis(pentafluorophenyl)borate in isopropyl alcohol, hereinafter referred to as photoacid generator b-2, was used instead of the photoacid generator b-1.

Example 3

The procedures of Example 1 were repeated to obtain silicone composition 3, except that a 50 mass % solution of bis[4-n-alkyl (C10-13) phenyl]iodonium tris(pentafluoroethyl)trifluorophosphate in isopropyl alcohol, hereinafter referred to as photoacid generator b-3, was used instead of the photoacid generator b-1.

Example 4

The procedures of Example 1 were repeated to obtain silicone composition 4, except that a mixture of 50 parts by mass of the aforesaid mixture (a-1) and 50 parts by mass of mixture (a-2) of an epoxy group-containing cation-polymerizable organopolysiloxane (A4) represented by the following formula (12) and an epoxy group-containing cation-polymerizable organopolysiloxane (A5) represented by the following formula (14) was used instead of the aforesaid component (A) in Example 1.
In the mixture (a-2), the weight ratio of component (A-4) to component (A5) was 1.0, an average epoxy equivalent was 800 g/mol, a content of volatile compounds was 1.6 mass %, a viscosity at 25 degrees C. was 350 mPa·s.

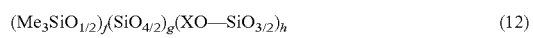

(12)

wherein f/(g+h) was 0.7 and X was a group represented by the following formula (13).

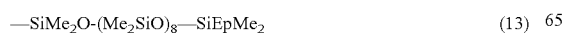

(13)

(14)

Example 5

The procedures of Example 4 were repeated to obtain silicone composition 5, except that a 50 mass % solution of bis[4-n-alkyl (C10-13) phenyl]iodonium tetrakis(pentafluorophenyl)borate in isopropyl alcohol, hereinafter referred to as photoacid generator b-2, was used instead of the photoacid generator b-1.

Example 6

The procedures of Example 4 were repeated to obtain silicone composition 6, except that a 50 mass % solution of bis[4-n-alkyl (C10-13) phenyl]iodonium tris(pentafluoroethyl)trifluorophosphate in isopropyl alcohol, hereinafter referred to as photoacid generator b-3, was used instead of the photoacid generator b-1.

Comparative Example 1

The procedures of Example 1 were repeated to obtain silicone composition 7, except that 100 parts by mass of mixture (y-1) of an epoxy group-containing cation-polymerizable organopolysiloxane represented by the following formula (a-a) and an epoxy group-containing cation-polymerizable organopolysiloxane represented by the following formula (a-c) was used instead of the aforesaid component (A) in Example 1. In the mixture (y-1), an average epoxy equivalent was 1100 g/mol, a content of volatile compounds was 2.5 mass %, a viscosity at 25 degrees C. was 140 mPa·s.

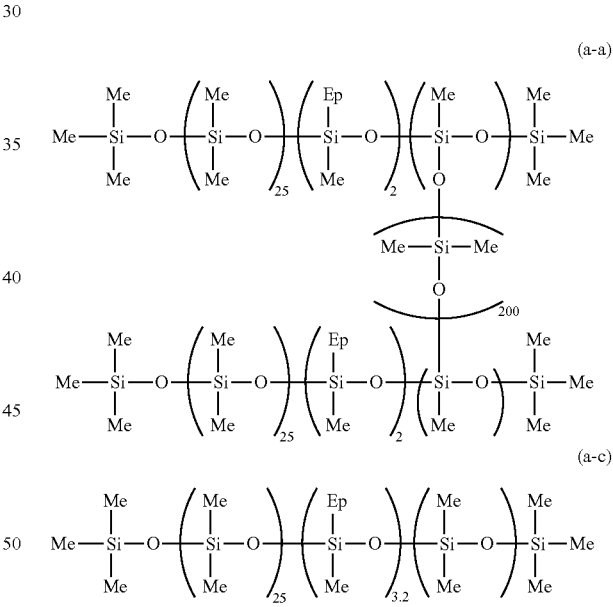

Comparative Example 2

The procedures of Comparative Example 1 were repeated to obtain silicone composition 8, except that a 50 mass % solution of bis[4-n-alkyl (C10-13) phenyl]iodonium tetrakis (pentafluorophenyl)borate in isopropyl alcohol, hereinafter referred to as photoacid generator b-2, was used instead of the photoacid generator b-1.

Comparative Example 3

The procedures of Comparative Example 1 were repeated to obtain silicone composition 9, except that a 50 mass % solution of bis[4-n-alkyl (C10-13) phenyl]iodonium tris (pentafluoroethyl)trifluorophosphate in isopropyl alcohol, hereinafter referred to as photoacid generator b-3, was used instead of the photoacid generator b-1.

Comparative Example 4

The procedures of Comparative Example 1 were repeated to obtain silicone composition 10, except that a mixture of 50 parts by mass of the aforesaid mixture (y–1) and 50 parts by mass of mixture (y-2) of an epoxy group-containing cation-polymerizable organopolysiloxane (A4') represented by the following formula (15) and an epoxy group-containing cation-polymerizable organopolysiloxane (A5') represented by the following formula (17) was used instead of aforesaid component (A) used in Comparative Example 1.

In the mixture (y-2), the weight ratio of component (A4') to component (A5') was 1.0, an average epoxy equivalent was 750 g/mol, a content of volatile compounds was 3.0 mass %, a viscosity at 25 degrees C. was 320 mPa·s. The structures of the cation-polymerizable organopolysiloxanes (A4') and (A5') were same as the structures of the cation-polymerizable organopolysiloxanes (A4) and (A5) used in Example 4. However, the cation-polymerizable organopolysiloxanes (A4') and (A5') included a larger amount of epoxy group-containing siloxanes which had low molecular weight weight and was volatile and, therefore, the average epoxy equivalent of mixture (y-2) was smaller than that of mixture (a-2).

$$(Me_3SiO_{1/2})_f(SiO_{4/2})_g(XO\!-\!SiO_{3/2})_h \quad (15)$$

wherein f/(g+h) was 0.7 and X was the group represented by the following formula (16).

$$-\!SiMe_2O\!-\!(Me_2SiO)_8\!-\!SiEpMe_2 \quad (16)$$

$$EpMe_2SiO\!-\!(Me_2SiO)_8\!-\!SiEpMe_2 \quad (17)$$

Comparative Example 5

The procedures of Example 1 were repeated to obtain silicone composition 11, except that a 50 mass % solution of 4-(isopropyl)-phenyl(p-tolyl) iodonium hexafluoroantimonate in isopropyl alcohol, hereinafter referred to as photoacid generator z-1, was used instead of the photoacid generator b-1.

Comparative Example 6

The procedures of Example 1 were repeated to obtain silicone composition 12, except that a 50 mass % solution of 4-(isopropyl)-phenyl(p-tolyl) iodonium tetrakis(pentafluorophenyl) borate in isopropyl alcohol, hereinafter referred to as photoacid generator z-1, was used instead of the photoacid generator b-1.

Comparative Example 7

The procedures of Example 1 were repeated to obtain silicone composition 13, except that a 50 mass % solution of 4-(isopropyl)-phenyl(p-tolyl) iodonium tris(pentafluoroethyl)trifluorophosphate in isopropyl alcohol, hereinafter referred to as photoacid generator z-3, was used instead of the photoacid generator b-1.

Cured products obtained from the silicone composition prepared in the Examples and the Comparative Examples were evaluated in the following manners.

[Curability]

The silicon composition was applied on polyethylene laminated high-quality paper by roll coating in an amount of approximately 0.8 g/m². The silicone composition was irradiated by ultraviolet rays of 15 mJ/cm² with two high-pressure mercury-vapor lamps of 80 W/cm to be cured, so that a cured film was formed. When the whole of the composition cured, the composition was evaluated as "A". When a part of the composition did not cure, the composition was evaluated as "B". When the whole of the composition did not cure, the composition was evaluated as "C". The results are as shown in Table 1.

[Force Needed for Releasing]

A force needed for releasing a cured film obtained from the silicone composition was determined in the following manner.

The silicone composition was applied on polyethylene laminated paper in an amount of approximately 0.8 g/m² to form a coating. The coating was irradiated by ultraviolet rays of 75 mJ/cm² with two high-pressure mercury-vapor lamps of 80 W/cm to form, a cured film. An acryl adhesive tape, TESA7475 (trade name), having a width of 25 mm was attached on the surface of the cured film and, then, the adhesive tape was pressed with one cycle of going and returning of a 2 kg roller to prepare a test sample. The test sample was aged at 70 degrees C. for 20 to 24 hours with a load of 70 g/cm² being applied. Then, the adhesive tape was peeled at an angle of 180° and a rate of 0.3 m/min with a tensile testing machine to determine a power, in N/25 mm, needed for peeling the adhesive tape from the cured film. The results are as shown in Table 1.

[Evaluation of Odor]

The odor of the cured film obtained in the aforesaid test for release was evaluated by twenty panelists and given scores according to the following criteria. The twenty scores were averaged. The results are as shown in Table 1.
4: Not smell
3: Slightly smell
2: Smell
1: Strongly smell

TABLE 1

|  |  |  |  | Example 1 | Example 2 | Example 3 | Example 4 | Example 5 | Example 6 |
|---|---|---|---|---|---|---|---|---|---|
| Component, part by mass | Organopoly siloxane | a-1 | Volatile compound: 1.2 mass % | 100 | 100 | 100 | 50 | 50 | 50 |
|  |  | a-2 | Volatile compound: 1.6 mass % |  |  |  | 50 | 50 | 50 |
|  | Photoacid generator | b-1 | R³: C16 to C18 | 2 |  |  | 2 |  |  |
|  |  | b-2 | R³: C16 to C18 |  | 2 |  |  | 2 |  |
|  |  | b-3 | R³: C16 to C18 |  |  | 2 |  |  | 2 |

TABLE 1-continued

| | | | Example 1 | Example 2 | Example 3 | Example 4 | Example 5 | Example 6 |
|---|---|---|---|---|---|---|---|---|
| Property | Curability | | A | A | A | A | A | A |
| | Force needed for peeling | N/25 mm | 0.15 | 0.13 | 0.14 | 0.83 | 0.79 | 0.81 |
| | Evaluation of odor | | 4 | 4 | 4 | 4 | 4 | 4 |

TABLE 2

| | | | | Com. Exam. 1 | Com. Exam. 2 | Com. Exam. 3 | Com. Exam. 4 | Com. Exam. 5 | Com. Exam. 6 | Com. Exam. 7 |
|---|---|---|---|---|---|---|---|---|---|---|
| Component, part by mass | Organopoly siloxane | a-1 | Volatile compound: 1.2 mass % | | | | | 100 | 100 | 100 |
| | | y-1 | Volatile compound: 2.5 mass % | 100 | 100 | 100 | 50 | | | |
| | | y-2 | Volatile compound: 3.0 mass % | | | | 50 | | | |
| | Photoacid generator | b-1 | $R^3$: C16 to C18 | 2 | | | 2 | | | |
| | | b-2 | $R^3$: C16 to C18 | | 2 | | | | | |
| | | b-3 | $R^3$: C16 to C18 | | | 2 | | | | |
| | | z-1 | $R^3$: C9 and C7 | | | | | 2 | | |
| | | z-2 | $R^3$: C9 and C7 | | | | | | 2 | |
| | | z-3 | $R^3$: C9 and C7 | | | | | | | 2 |
| Property | Curability | | | A | A | A | A | B | B | B |
| | Force needed for peeling | | N/25 mm | 0.17 | 0.15 | 0.18 | 0.87 | 0.16 | 0.14 | 0.15 |
| | Evaluation of odor | | | 3 | 3 | 3 | 2 | 3 | 3 | 3 |

INDUSTRIAL APPLICABILITY

The present radiation-curable silicone composition provides a cured silicone product whose odor is decreased, particularly is odorless, and has excellent curability and releasing properties. Further, the present radiation-curable silicone composition provides cured products having various releasing properties such as a release with strong force and a release with less force. That is, it is possible to control a releasing force of the cured product. Accordingly, the present silicone composition is usable to produce articles with a releasing property.

The invention claimed is:

1. A radiation-curable silicone composition comprising the following components (A) and (B):
   (A) an epoxy group-containing cation-polymerizable organopolysiloxane which is represented by the following average composition formula (1):

$$R^1_a R^2_b SiO_{(4-a-b)/2} \quad (1)$$

wherein $R^1$ is, independently of each other, an epoxy group-containing monovalent organic group, $R^2$ is, independently of each other, a substituted or unsubstituted monovalent hydrocarbon group having 1 to 10 carbon atoms, a>0, b>0 and a total of a and b is in a range of larger than 0 and at most 3, and
   (B) an iodonium salt having a cation moiety represented by the following general formula (2) in an effective amount to cure said component (A), $$[(R^3)\text{—I—}(R^3)]^+ \quad (2)$$

wherein $R^3$ is, independently of each other, a substituted or unsubstituted monovalent aromatic hydrocarbon group having 15 to 26 carbon atoms, wherein said component (A) is accompanied by other compounds that volatilize during heating at 105 degrees C. for 3 hours, and a content of said compounds is at most 2.0 mass %, based on a total amount of component (A) and said compounds, and
   the compounds volatilizing during heating at 105 degrees C. for 3 hours comprise at least an epoxy group-containing low molecular weight organopolysiloxane having a degree of polymerization of 8 or lower.

2. The radiation-curable silicone composition according to claim 1, wherein the compounds volatilizing during heating at 105 degrees C. for 3 hours further comprise a starting alkenyl group-containing epoxy compound used in the preparation of the cation-polymerizable organopolysiloxane.

3. The radiation-curable silicone composition according to claim 1, wherein the content of the compounds volatilizing during heating at 105 degrees C. for 3 hours, based on a total amount of component (A) and said compounds is 1.8 mass % or less.

4. The radiation-curable silicone composition according to claim 3, wherein the content of the compounds volatilizing during heating at 105 degrees C. for 3 hours, based on a total amount of component (A) and said compounds is 1.5 mass % or less.

5. The radiation-curable silicone composition according to claim 1, wherein a part of hydrogen atoms bonded to carbon atoms of the aromatic hydrocarbon group, $R^3$, in the formula (2) is substituted with a linear or branched alkyl group having 9 to 20 carbon atoms.

6. The radiation-curable silicone composition according to claim 1, wherein component (B) has an anion moiety selected from the group consisting of $SbF_6^-$, $[B(C_6F_5)_4]^-$, $[B(C_6H_4CF_3)_4]^-$, $[(C_6F_5)_2BF_2]^-$, $[C_6F_5BF_3]^-$, $[B(C_6H_3F_2)_4]^-$, $[(CF_3CF_2)_3PF_3]^-$, $[(CF_3CF_2CF_2)_3PF_3]^-$, $[((CF_3)_2CF)_3PF_3]^-$, $[((CF_3)_2CF)_2PF_4]^-$, $[((CF_3)_2CFCF_2)_3PF_3]^-$ and $[((CF_3)_2CFCF_2)_2PF_4]^-$.

7. The radiation-curable silicone composition according to claim 1, wherein component (A) is at least one selected from organopolysiloxane (A1) represented by the following average formula (3), organopolysiloxane (A2) represented by the following average formula (4) and organopolysiloxane (A3) represented by the following average formula (5):

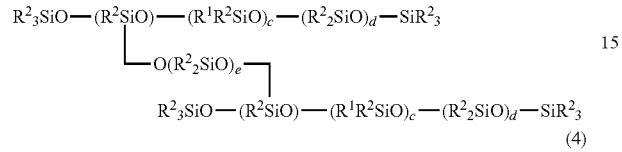

(3)

$R^2{}_3SiO-(R^2SiO)-(R^1R^2SiO)_c-(R^2{}_2SiO)_d-SiR^2{}_3$
$\quad\quad\quad\quad |$
$\quad\quad\quad\quad O(R^2{}_2SiO)_e$
$R^2{}_3SiO-(R^2SiO)-(R^1R^2SiO)_c-(R^2{}_2SiO)_d-SiR^2{}_3$ (4)

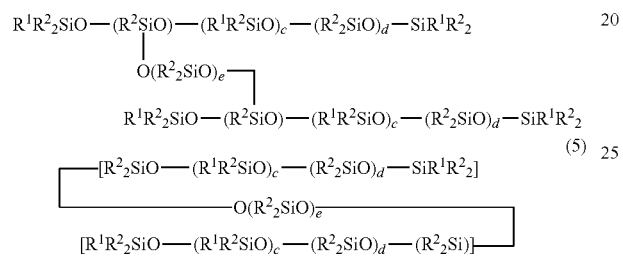

$R^1R^2{}_2SiO-(R^2SiO)-(R^1R^2SiO)_c-(R^2{}_2SiO)_d-SiR^1R^2{}_2$
$\quad\quad\quad\quad |$
$\quad\quad\quad\quad O(R^2{}_2SiO)_e$
$R^1R^2{}_2SiO-(R^2SiO)-(R^1R^2SiO)_c-(R^2{}_2SiO)_d-SiR^1R^2{}_2$ (5)

$[-[R^2{}_2SiO-(R^1R^2SiO)_c-(R^2{}_2SiO)_d-SiR^1R^2{}_2]$
$\quad\quad\quad -O(R^2{}_2SiO)_e-$
$[R^1R^2{}_2SiO-(R^1R^2SiO)_c-(R^2{}_2SiO)_d-(R^2{}_2Si)]-]$ wherein $R^1$ and $R^2$ are as defined above, c is, independently of each other, a positive number of 2 or larger, d is, independently of each other, 0 or a positive number, and e is a positive number of 2 or larger.

8. The radiation-curable silicone composition according to claim 1, wherein component (A) comprises the following components (A4) and (A5) in a weight ratio of 0.1 to 1.5:

(A4) an organopolysiloxane represented by the following average formula (6):

$(R^2{}_3SiO_{1/2})_f(SiO_{4/2})_g(XO-SiO_{3/2})_h$ (6)

wherein $R^2$ is as defined above, X is, independently of each other, a hydrogen atom or a group represented by the following formula (7), (8) or (9), f, g, and h are positive numbers satisfying the equation, $f/(g+h)=0.5$ to 2, $-(R^2{}_2SiO)-(R^1R^2SiO)_i-(R^2{}_2SiO)_z-SiR^1{}_kR^2{}_{3-k}$ (7)

(8)

$R^1{}_xR^2{}_{3-x}SiO-(R^2{}_2SiO)_m-(R^1R^2SiO)_n-(R^2{}_2SiO)-SiR^1{}_xR^2{}_{3-x}$ (9)

$[-(R^2{}_2SiO)_o-(R^1R^2SiO)_p-(R^2{}_2SiO)-]$ wherein $R^1$ and $R^2$ are as defined above, i, z, m, n and o are, independently of each other, 0 or a positive number, p is a positive number of 1 or larger, provided that a total of i and z is 1 to 50, a total of m and n is 1 to 50, a total of o and p is 2 to 7, and k and x are, independently of each other, 0, 1, 2 or 3, provided that a total of i and k is 1 or larger and a total of n and x is 1 or larger, (A5) an organopolysiloxane represented by the following average formula (10) or (11):

$R^1{}_qR^2{}_{3-q}SiO-(R^2{}_2SiO)_r-(R^1R^2SiO)_s-SiR^1{}_qR^2{}_{3-q}$ (10)

(11)

$[-(R^2{}_2SiO)_t-(R^1R^2SiO)_u-]$ wherein $R^1$ and $R^2$ are as defined above, r, s, and t are, independently of each other, 0 or a positive number, u is a positive number of 1 or larger, provided that a total of r and s is 3 to 55, a total of t and u is 3 to 8, and q is 0, 1, 2 or 3, provided that s and q is not zero at the same time.

9. An article having a substrate, wherein substrate has on its surface a cured product obtained by curing the radiation-curable silicone composition according to claim 1, so that the surface has a releasing property.

\* \* \* \* \*